(12) United States Patent
Van Horn

(10) Patent No.: US 9,815,955 B2
(45) Date of Patent: *Nov. 14, 2017

(54) TETRAFLUOROPROPENE BASED BLOWING AGENT COMPOSITIONS

(75) Inventor: Brett L. Van Horn, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/146,442

(22) PCT Filed: Jan. 28, 2010

(86) PCT No.: PCT/US2010/022306
§ 371 (c)(1),
(2), (4) Date: Jul. 27, 2011

(87) PCT Pub. No.: WO2010/088320
PCT Pub. Date: Aug. 5, 2010

(65) Prior Publication Data
US 2011/0288192 A1 Nov. 24, 2011

Related U.S. Application Data

(60) Provisional application No. 61/148,099, filed on Jan. 29, 2009.

(51) Int. Cl.
C08J 9/14 (2006.01)
C08J 9/00 (2006.01)
C08J 9/12 (2006.01)

(52) U.S. Cl.
CPC ............ *C08J 9/149* (2013.01); *C08J 9/127* (2013.01); *C08J 2203/06* (2013.01); *C08J 2203/10* (2013.01); *C08J 2203/12* (2013.01); *C08J 2203/14* (2013.01); *C08J 2203/142* (2013.01); *C08J 2203/162* (2013.01); *C08J 2203/182* (2013.01); *C08J 2323/06* (2013.01); *C08J 2323/12* (2013.01); *C08J 2325/06* (2013.01); *C08J 2325/12* (2013.01)

(58) Field of Classification Search
CPC ... C08J 9/149; C08J 9/127; C08J 9/146; C08J 2203/06; C08J 2203/162; C08J 2203/182; C08J 2325/06
USPC ................................ 521/82, 88, 97, 98, 131
See application file for complete search history.

(56) References Cited

U.S. PATENT DOCUMENTS

| | | | |
|---|---|---|---|
| 7,524,805 B2 | 4/2009 | Diringer et al. | |
| 7,536,136 B2 | 5/2009 | Hasegawa et al. | |
| 7,655,610 B2 | 2/2010 | Singh et al. | |
| 8,114,828 B2 | 2/2012 | Bowman et al. | |
| 2004/0119047 A1 | 6/2004 | Singh et al. | |
| 2004/0256594 A1* | 12/2004 | Singh ................ | A62D 1/0057 252/71 |
| 2006/0043331 A1 | 3/2006 | Shankland et al. | |
| 2006/0106122 A1* | 5/2006 | Naito et al. ............. | 521/79 |
| 2006/0211782 A1* | 9/2006 | Handa et al. ............ | 521/79 |
| 2007/0010592 A1* | 1/2007 | Bowman et al. ......... | 521/131 |
| 2008/0125505 A1 | 5/2008 | Bowman et al. | |
| 2008/0135800 A1 | 6/2008 | Bowman et al. | |

FOREIGN PATENT DOCUMENTS

| | | | |
|---|---|---|---|
| CA | 2016328 | 6/2000 | |
| CA | 2 826 532 | 11/2005 | |
| GB | 950876 | 2/1964 | |
| WO | WO 2004/037752 A2 | 5/2004 | |
| WO | WO 2004/037913 | 5/2004 | |
| WO | WO 2007/002703 | 1/2007 | |
| WO | WO 2008121776 A1 * | 10/2008 | ............ C11D 17/00 |

* cited by examiner

*Primary Examiner* — Kara Boyle
(74) *Attorney, Agent, or Firm* — Steven D. Boyd

(57) ABSTRACT

The present invention relates to blowing agent compositions comprising tetrafluoropropene (HFO) and at least one co-blowing agent selected from carbon dioxide, water, alkanes and an alcohol used in the preparation of foamable thermoplastic compositions having low density. The HFOs include, but are not limited too, cis- and/or trans-1,3,3,3-tetrafluoropropene (HFO-1234ze), 2,3,3,3-tetrafluoropropene (HFO 1234yf), or mixtures thereof. The blowing agent compositions are useful in the production of low density insulating foams with improved R value.

3 Claims, No Drawings

TETRAFLUOROPROPENE BASED BLOWING AGENT COMPOSITIONS

SUMMARY OF INVENTION

The present invention relates to blowing agent compositions comprising tetrafluoropropene (HFO) and at least one co-blowing agent selected from carbon dioxide, water, alkanes and an alcohol used in the preparation of foamable thermoplastic compositions having low density. The tetrafluorpropene component is selected from cis- and/or trans-1,3,3,3-tetrafluoropropene (HFO-1234ze), 2,3,3,3-tetrafluoropropene (HFO 1234yf) or mixtures thereof. The co-blowing agent is selected from carbon dioxide, water, alkanes, an alcohol such as ethanol or mixtures thereof. The blowing agent compositions are useful in the production of low density insulating foams with improved R-value properties.

BACKGROUND OF INVENTION

With the continued concern over global climate change there is an increasing need to develop technologies to replace those with high ozone depletion potential (ODP) and high global warming potential (GWP). Though hydrofluorocarbons (HFC), being non-ozone depleting compounds, have been identified as alternative blowing agents to chlorofluorocarbons (CFCs) and hydrochlorofluorocarbons (HCFCs) in the production of thermoplastic foams, they still tend to have significant GWP.

Hydrofloroolefins, such as HFO-1243zf, (cis/trans)-HFO-1234ze, HFO-1234yf, and (E/Z)-HFO-1225ye, have been identified as potential low GWP blowing agents for the production of thermoplastic foams, including extruded polystyrene foams for thermal insulation.

It was discovered that blowing agent compositions comprising a tetrafluoropropene and at least one co-blowing agent selected from carbon dioxide, water, alkanes and an alcohol can permit the production of lower density, closed-cell foam with good long term R value which will be particularly useful for thermal insulating foams. This invention may also permit the production of low density, closed-cell foams with enlarged, controlled cell size.

WO 2004/037913, WO 2007/002703, and US Pat. Publication 2004119047 disclose blowing agents comprising halogenated alkenes of generic formula that would include numerous HFOs and HCFOs, among many other materials including brominated and iodinated compounds. Specific examples are shown for blowing agent compositions for foaming polystyrene comprising HFOs, specifically HFO-1234ze and HFO-1234yf, either alone or in combination with an HFC, and blowing agent compositions for PUR foaming comprising HCFO-1233zd.

GB 950,876 discloses a process for the production of polyurethane foams. It discloses that any suitable halogenated saturated or unsaturated hydrocarbon having a boiling point below 150° C., preferably below 50° C., can be used as the blowing agent. Trichlorofluoroethene, chlorotrifluoroethene, and 1,1-dichloro-2,2-difluoroethene are disclosed in a list of suitable blowing agents along with 3,3,3-trifluoropropene.

CA 2016328 discloses a process for preparing closed-cell, polyisocyanate foam. Disclosed are organic compound blowing agents including halogenated alkanes and alkenes, where the alkene is propylene, and the halogenated hydrocarbons can be chlorofluorocarbons. Among the many exemplary compounds listed are specific chlorofluoroethylenes containing 1 chlorine and from 1 to 3 fluorines along with specific pentafluoropropene, tetrafluoropropene, and difluoropropene.

US 2008/135800 discloses the use of HFO-1234ze as blowing agent for polystyrene foaming. Blowing agent compositions shown in examples include: 100% trans-HFO-1234ze, 50 wt % trans-HFO-1234ze and 50 wt % HFC-245fa, and 80 wt % HFO-1234ze and 20 wt % HFC-245fa. Of the polystyrene foam examples shown using 1234ze in the blowing agent formulation, the lowest density produced was about 5 pcf. The patent application discloses that water, $CO_2$, and alcohols can be used as coblowing agents and claims various composition ranges that these coblowing agents could be used (eg. 10% to 20% water, etc).

In the production of insulating foam it is desired to have low density foamed products that maintain a high, long term R-value (insulating value). Though HFC-134a can provide long term R-value it is not soluble enough in polystyrene to produce foam product to the same low density as with using HCFC-142b or CFC-12. HFC-134a also has a very high nucleation density such that foams produced with it tend to have a very fine cell structure, which is not desired in all applications. HFC-152a and HFC-32 can be used to produce lower density foams with larger cell sizes than with HFC-134a but their high diffusivities in polystyrene will result in foams that age faster and don't possess the same long term R-value.

DETAILED DESCRIPTION OF INVENTION

The present invention relates to the use of blowing agents with negligible ozone-depletion and low GWP comprising tetrafluoropropene and at least one co-blowing agent selected from carbon dioxide, water, alkanes and an alcohol and mixtures thereof. The present invention discloses blowing agent and foamable resin compositions useful for the production of foams with decreased density and improved long term R value that can be used as insulating foams. In a preferred embodiment of this invention the tetrafluoropropene is selected from cis- and/or trans-1,3,3,3-tetrafluoropropene (HFO-1234ze), 2,3,3,3-tetrafluoropropene (HFO 1234yf) or mixtures thereof. The co-blowing agent of component is selected from carbon dioxide, water, 1,1-difluoroethane, alkanes and an alcohol, such as ethanol, and mixtures thereof. The blowing agent combination of the present invention provides for thermoplastic foams having a density of less than 5 pounds per cubic foot (pcf), desirably 4.5 pcf and less, preferably less than 3 pcf, even more preferably less than 2 pcf, and even more preferably from about 1.5 pcf to about 2 pcf.

It was discovered that it is possible to produce low density foams, particularly of polystyrene, where the blowing agent is a combination of HFO-1234ze and at least one co-blowing agent selected from carbon dioxide, water, alkanes and an alcohol and mixtures thereof, where the foam density can be less 5 pcf (80 kg/m$^3$) and even about 4 pcf (64 kg/m$^3$) or less. It was also discovered that this can be done using less total blowing agent then previously demonstrated. It was found that foamable resin compositions containing less than 10 wt % blowing agent could still achieve a foam density of less 5 pcf. Previous work using HFO-1234ze disclosed using 10 wt % to 14 wt % total blowing agent to achieve foams of no less than 5 pcf in density when using HFO-1234ze. The inclusion of co-blowing agents was found to provide for further reductions in foam density and improvements in foam properties and/or processibility The composition of the present invention can comprise about 50 wt % or more tetrafluoropropene, preferably 60 wt % or more tetrafluoropropene. The tetrafluoropropene is preferably 1,3,3,3-tetrafluoropropene, and even more preferably predominantly the trans-isomer of 1,3,3,3-tetrafluoropropene. The compositions would be useful in the production of thermal insulating foams, particularly thick-sectioned foams of greater than or equal to about ½ inch thick.

Preferred compositions of the present invention comprise from greater than about 5 wt % $CO_2$ to about 90 wt % $CO_2$, preferably greater than 50 wt % CO2, and more preferably greater than about 70 wt % CO2, and the majority of the remaining blowing agent comprising 1234ze. Compositions may optionally contain an alcohol, preferably ethanol, from about 5 wt % to less than about 40 wt %, and/or less than from about 2 wt % to about 15 wt %, preferably less than 5 wt % water. These compositions would be particularly useful in the production of thin sectioned insulating foams.

The open cell content of the foam of the present invention can be varied dependant on the specific combination and ratios of components of the blowing agent. Open cell contents of greater than 50% are achievable as well as open cell contents of from about 0% to less than about 30%. For applications such as thermal insulating foams and marine floatation, open cell contents of less than about 10% and most preferably less than about 5% are desired. The average cell size of the foam of the present invention can range from about 0.02 mm to about 5 mm, preferably form about 0.05 to about 1 m and most preferably from about 0.1 to about 0.5 mm.

Additional preferred blowing agent compositions for production of polymer foam comprise 5 to 50 wt % $CO_2$, preferably 5 to 25 wt % $CO_2$, and greater than 50 wt % 1234ze. Compositions may optionally contain an alcohol, preferably ethanol, from 5 to less than about 40 wt % and/or less than 15 wt % water, preferably less than 5 wt % water. In one embodiment of the present invention, the blowing agent compositions optionally contain between 1 wt % and 15 wt % water. These foams would be particularly useful in the production of thick-sectioned insulating foams.

Water can be used as an additional blowing agent for blends of 1234ze/CO2/water and 1234ze/CO2/ethanol/water. Water can be used from about 10 wt % or less in the blends.

The present invention will show that for $CO_2$-rich formulations, 1234ze will improve the dimensional stability of the foam. Ethanol can further help to reduce density and provide enlargement in cell size and improve cell size uniformity.

For 1234ze-rich formulations, $CO_2$ will permit production of lower density foam than 1234ze alone. Ethanol added to 1234ze and $CO_2$ combination will permit production of even lower density foam but may increase the permeability of 1234ze from the foam, so there will be an optimal quantity permissible and the level of $CO_2$ or ethanol will likely depend on the level of the other.

Blends of 1234ze and HFC-152a (1,1-difluoroethane) are also particularly useful. Blends from around 25 wt % to around 75 wt % 1234ze will be preferred, particularly those around 50 wt % 1234ze. Blowing agent blends of 1234ze and 152a at ratios of between 1:3 and 3:1, preferably of between 1:2 and 2:1, optionally with $CO_2$ at around 1 to 3 wt % in the total formulation, and optionally with ethanol at around 10 wt %, 20 wt %, and 30 wt % in the blowing agent formulation are be effective in accordance with the present invention.

Blends of 1234ze with alkanes are useful, particularly those with pentanes, including cyclopentane, normal pentane, isopentane, and mixtures thereof. Blends at around 50 wt % 1234ze with various pentanes and from 0 to 3 wt % $CO_2$ in the total formulation are effective in accordance with the present invention. In another embodiment of the present invention are blowing agent compositions comprising tetrafluoropropene and from about 5 wt % to about 50 wt % of an alkane.

In another embodiment of the present invention, the tetrafluoropropene in the blends described above is HFO-1234yf.

Foams described in the present invention can have a good skin quality, essentially free of defects, and can uniform cell size variations. Foam defects include, among others, blow-holes and large voids, such as caused by undissolved blowing agent in the resin, and bubbles on the foam skin.

Another embodiment of this invention are foamable resin compositions containing greater than about 1 parts per hundred (pph) and less than about 100 pph of the blowing agent composition with respect to resin, preferably greater than about 2 pph and less than about 40 pph, more preferably greater than about 3 pph and less than about 25 pph, and even more preferably greater than about 4 pph and less than about 15 pph of the blowing agent composition with respect to resin.

The process for preparing a foamed thermoplastic product is as follows: Prepare a foamable polymer composition by blending together components comprising foamable polymer composition in any order. Typically, prepare a foamable polymer composition by plasticizing a polymer resin and then blending in components of a blowing agent composition at an initial pressure. A common process of plasticizing a polymer resin is heat plasticization, which involves heating a polymer resin enough to soften it sufficiently to blend in a blowing agent composition. Generally, heat plasticization involves heating a thermoplastic polymer resin near or above its glass transition temperature (Tg), or melt temperature (Tm) for crystalline polymers.

In one embodiment of the present invention the thermoplastic polymer composition comprises polymers containing styrene, ethylene, propylene, and mixtures thereof. In a preferred embodiment of the present invention, the thermoplastic polymer composition comprises polymers containing styrene, including, but not limited to, polystyrene, styrene-acrylonitrile copolymers, and mixtures thereof. In another embodiment of the present invention, the styrenic thermoplastic polymer composition comprises less than about 35 wt % copolymerized acrylonitrile.

A foamable polymer composition can contain additional additives such as nucleating agents, cell-controlling agents, dyes, pigments, fillers, antioxidants, extrusion aids, stabilizing agents, antistatic agents, fire retardants, IR attenuating agents and thermally insulating additives. Nucleating agents include, among others, materials such as talc, calcium carbonate, sodium benzoate, and chemical blowing agents such azodicarbonamide or sodium bicarbonate and citric acid. IR attenuating agents and thermally insulating additives can include carbon black, graphite, silicon dioxide, metal flake or powder, among others. Flame retardants can include, among others, brominated materials such as hexabromocyclodecane and polybrominated biphenyl ether.

Foam preparation processes of the present invention include batch, semi-batch, and continuous processes. Batch processes involve preparation of at least one portion of the foamable polymer composition in a storable state and then using that portion of foamable polymer composition at some future point in time to prepare a foam.

A semi-batch process involves preparing at least a portion of a foamable polymer composition and intermittently expanding that foamable polymer composition into a foam all in a single process. For example, U.S. Pat. No. 4,323,528, herein incorporated by reference, discloses a process for making polyolefin foams via an accumulating extrusion process. The process comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone has a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand to form the foam.

A continuous process involves forming a foamable polymer composition and then expanding that foamable polymer composition in a non-stop manner. For example, prepare a foamable polymer composition in an extruder by heating a polymer resin to form a molten resin, blending into the molten resin a blowing agent composition at an initial pressure to form a foamable polymer composition, and then extruding that foamable polymer composition through a die into a zone at a foaming pressure and allowing the foamable polymer composition to expand into a foam. Desirably, cool the foamable polymer composition after addition of the blowing agent and prior to extruding through the die in order to optimize foam properties. Cool the foamable polymer composition, for example, with heat exchangers.

Foams of the present invention can be of any form imaginable including sheet, plank, rod, tube, beads, or any combination thereof. Included in the present invention are laminate foams that comprise multiple distinguishable longitudinal foam members that are bound to one another.

The advantageous properties of the present invention can be referenced to the following examples, which illustrate but do no limit the present invention.

EXAMPLES

Extruded polystyrene foam was produced using a counter-rotating twin screw extruder with an internal barrel diameter of 27 mm and a barrel length of 40 diameters. The screw design was suitable for foaming applications. The pressure in the extruder barrel was controlled with the gear pump and was set high enough such that the blowing agent dissolved in the extruder. The extruder die was an adjustable-lip slot die with a gap width of 6.35 mm. A general purpose polystyrene resin (Total Petrochemicals PS-523W, MFI=11) was used for the extrusion trials and fed to the extruder at controlled rates of about either 3.64 kg/hr (8 lb/hr) or 4.54 kg/hr (10 lb/hr). Blowing agents were pumped into the polystyrene resin melt at controlled rates using high-pressure delivery pumps. In the extruder, the blowing agent was mixed and dissolved in the resin melt to produce an expandable resin composition. The expandable resin composition was cooled to an appropriate foaming temperature and then extruded from the die where the drop in pressure initiates foaming. In some examples, talc was used as a nucleating agent and was pre-blended with polystyrene to make a masterbatch of 50 wt % talc in polystyrene. Beads of this masterbatch were mixed with polystyrene pellets to achieve the desired wt % talc in each experiment.

A portable halocarbon detector was used to verify that there were no significant leaks of blowing agent from the extruder, such as out of the resin feed port, around the injector or pressure transducer ports, at adapter flanges, etc. Significant leaks of blowing agent from the extruder will result in uncertainty in the formulation or overestimation of the amount of blowing agent added. In all the examples no leak of blowing agent was detected.

Typical foam properties measured include density, open cell content, and cell size. Density was measured according to ASTM D792 or using a simple water displacement method, open cell content was measured using gas pychnometry according to ASTM D285-C, and cell size was measured by averaging the cell diameters from scanning electron microscope (SEM) micrographs of foam sample fracture surfaces. SEM images are also used to observe the cell structure and qualitatively check for open cell content.

Comparative Examples 1-3: E-HFO-1234ze Blown Foam

Comparative examples 1 through 3 were produced using E-HFO-1234ze (trans-1,3,3,3-tetrafluoropropene) as the blowing agent at loadings of 5.9 wt %, 7.0 wt %, and 7.9 wt % respectively at a resin feed rate of 4.54 kg/m$^3$. The density and average cell size of the resulting foams is shown in Table 1. Increasing the quantity of blowing agent above 5.9 wt % did not result in a decrease in foam density when using essentially E-HFO-1234ze as the blowing agent. There were also increasing foam defects as the wt % of E-HFO-1234ze used as the blowing agent increased from 5.9 wt % to 7.0 wt % to 7.9 wt %; at 7.9 wt % there were noticeably more blowholes.

TABLE 1

| E-HFO-1234ze Blown Foam | | | |
|---|---|---|---|
| Example | wt % 1234ze | Density (kg/m$^3$) | Open Cell % | Avg. Cell Size (micron) |
| 1 | 5.9 | 66.1 | <10% | ~250 |
| 2 | 7.0 | 68.8 | <10% | ~150 |
| 3 | 7.9 | 69.3 | <10% | ~200 |

Comparative Example 4: HFO-1234yf Blown Foam

Comparative example 4 was produced using HFO-1234yf tetrafluoropropene) as the blowing agent at a loading of 5.7 wt % at a resin feed rate of 4.54 kg/m$^3$. The resulting foam had a density of 71.6 kg/m$^3$ (4.5 pcf) and an open cell content of <15%.

Comparative Example 5: HFC-134a/CO$_2$ Blown Foam

Comparative example 5 was produced using HFC-134a (1,1,1,2-tetrafluoroethane) as the blowing agent and carbon dioxide (CO$_2$) as the coblowing agent at a resin feed rate of 3.64 kg/m$^3$. HFC-134a was used at a loading of 5 wt % and CO$_2$ was used at a loading of 1 wt %. The foam had a density of 52.3 kg/m$^3$ (3.26 pcf), average cell size of <100 micron, but had numerous defects and blowholes. SEM images showed the foam to be highly open celled.

Example 6: HFO-1234ze/CO$_2$ Blown Foam

Example 6 was produced in the same manner, and using nearly the same processing conditions, as Comparative Example 5 except that E-HFO-1234ze was used as the blowing agent in place of HFC-134a (1,1,1,2-tetrafluoroethane); carbon dioxide (CO$_2$) was used as the coblowing agent. E-HFO-1234ze was used at a loading of 5.2 wt % and CO$_2$ was used at a loading of 1 wt %. The foam had a density of 55.6 kg/m$^3$ (3.47 pcf), average cell size of <100 micron, and had very few defects. This is in contrast to Comparative Example 5, where at almost identical processing conditions and blowing agent loadings there were significant foam defects. SEM images showed the foam had relatively high open cell content but more uniform cell structure than Comparative Example 5.

Example 7: HFO-1234ze/CO$_2$ Blown Foam

Example 6 was produced in the same manner as Example 6 except that E-HFO-1234ze was used at a loading of 4.5 wt % and CO$_2$ was used at a loading of 1 wt %. The foam had a density of 55.5 kg/m$^3$ (3.46 pcf), an average cell size of <100 micron, and had no obvious defects. SEM images showed the foam to be predominantly closed cell, having lower open cell content than Example 6.

Example 8: HFO-1234ze/HFC-152a Blown Foam

Example 8 was produced in the same manner as Example 6 except that E-HFO-1234ze and HFC-152a (1,1-difluoroethane) were used as the blowing agents. E-HFO-1234ze was used at a loading of 5.0 wt % and HFC-152a was used at a loading of 4.0 wt %. The foam had a density of 50.6 kg/m$^3$ (3.16 pcf) and had some blowholes.

Example 9: HFO-1234ze/HFC-152a/CO$_2$ Blown Foam

Example 9 was produced in the same manner as Example 8 except that CO$_2$ was used as a co-blowing agent. E-HFO-1234ze was used at a loading of 5.0 wt %, HFC-152a was used at a loading of 4.0 wt %, and CO$_2$ was used at a loading of 0.6 wt %. The foam had a density of 50.5 kg/m$^3$ (3.15 pcf) and had some blowholes.

Example 10: HFO-1234ze/HFC-152a Blown Foam

Example 10 was produced in the same manner as Example 6 except that E-HFO-1234ze was used at a loading of 4.5 wt % and HFC-152a was used at a loading of 1.8 wt %. The foam had a density of 52.9 kg/m$^3$ (3.30 pcf) and had no obvious defects.

Example 11: HFO-1234ze/Ethanol/CO$_2$ Blown Foam

Example 11 was produced in the same manner as Example 6 except that the blowing agent combination included E-HFO-1234ze, CO$_2$, and dry ethanol (EtOH). E-HFO-1234ze was used at a loading of 7.0 wt %, CO$_2$ was used at a loading of 0.6 wt %, and ethanol was used at a loading of 2.0 wt %. The foam had a density of 49.8 kg/m$^3$ (3.11 pcf), an average cell size of <50 micron, and had very few defects.

Example 12: HFO-1234ze/Ethanol Blown Foam

Example 12 was produced in the same manner as Example 11 except that the blowing agent combination included only E-HFO-1234ze and dry ethanol (EtOH). E-HFO-1234ze was used at a loading of 7.1 wt % and ethanol was used at a loading of 1.8 wt %. The foam had a density of 50.7 kg/m$^3$ (3.16 pcf), an average cell size of <50 micron, and had no obvious defects.

Example 13: HFO-1234ze/Cyclopentane Blown Foam

Example 13 was produced in the same manner as Example 6 except that E-HFO-1234ze and cyclopentane (cC5) were used as the blowing agents. E-HFO-1234ze was used at a loading of 5.0 wt % and cyclopentane was used at a loading of 4.0 wt %. The foam had a density of 40.2 kg/m$^3$ (2.51 pcf) and had no obvious defects, had a large cross-section, and had enlarged cell size (>250 μm). SEM images showed the cell structure to be almost completely closed-cell. The backpressure at the extruder die was noticeably lower than with examples 1 through 12, at ~970 psig, indicating increased processability.

The results of Examples 6 through 13 and Comparative Examples 1, 2, 3, and 5 are shown in Table 2. The examples show that the blowing agent combinations of the present invention permit the production of polystyrene foam of lower density and/or larger cell size than when using tetrafluoropropene as the only blowing agent.

TABLE 2

| | Blowing Agent Loading | | | | | | Foam Properties | |
|---|---|---|---|---|---|---|---|---|
| Example | 134a (wt %) | 1234ze (wt %) | CO2 (wt %) | 152a (wt %) | EtOH (wt %) | cC5 (wt %) | Density (kg/m$^3$) | Comments |
| Comp. 1 | — | 5.9 | — | — | — | — | 66.1 | Very few defects |
| Comp. 2 | — | 7.0 | — | — | — | — | 68.8 | Few defects |
| Comp. 3 | — | 7.9 | — | — | — | — | 69.3 | Some blowholes |
| Comp. 5 | 5.0 | — | 1.0 | — | — | — | 52.3 | Defects, blowholes |
| 6 | — | 5.2 | 1.0 | — | — | — | 55.6 | Very few defects |
| 7 | — | 4.5 | 1.0 | — | — | — | 55.5 | No defects |
| 8 | — | 5.0 | — | 4.0 | — | — | 50.6 | Some blowholes |
| 9 | — | 5.0 | 0.6 | 4.0 | — | — | 50.5 | Some blowholes |
| 10 | — | 4.5 | — | 1.8 | — | — | 52.9 | No defects |
| 11 | — | 7.0 | 0.6 | — | 2.0 | — | 49.8 | Very few defects |
| 12 | — | 7.1 | — | — | 1.8 | — | 50.7 | No defects |
| 13 | — | 5.0 | — | — | — | 4.0 | 40.2 | No defects |

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A polystyrene polymer foam comprising a foamable resin and a blowing agent composition consisting of 50 wt % or more the tetrafluoropropene 1,3,3,3-tetrafluoropropene (HFO-1234ze) and at least one co-blowing agent selected from carbon dioxide, ethanol, and mixtures thereof, wherein said polymer foam comprises less than 10 wt % of said blowing agent composition and said polymer foam has a density of less than 4 pounds per cubic foot and an average cell size of from about 50 to about 500 microns.

2. The polymer foam of claim 1 having a density of between about 1.5 pounds per cubic foot and about 4 pounds per cubic foot.

3. The polymer foam of claim 1 having an open cell content of less than about 50%.

* * * * *